Sept. 29, 1959   BUNJIRO ICHIJO   2,906,950
MULTIPLE-TUNING TYPE, DIFFERENTIAL-ARRANGEMENT
DEVICE FOR MEASURING REACTANCES
Filed March 12, 1957   4 Sheets-Sheet 1
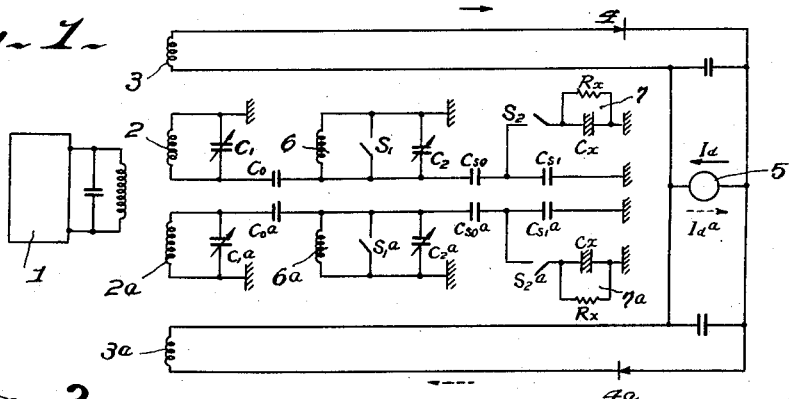
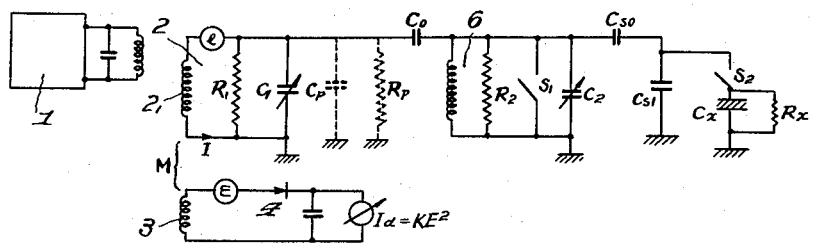
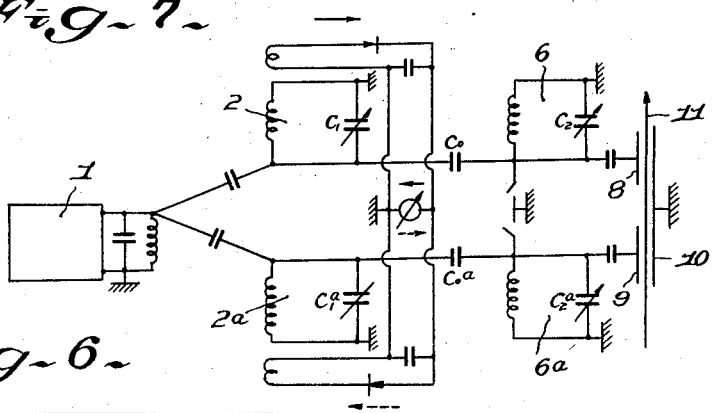
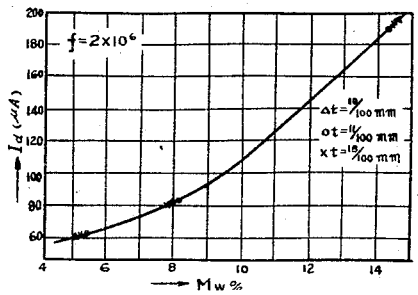

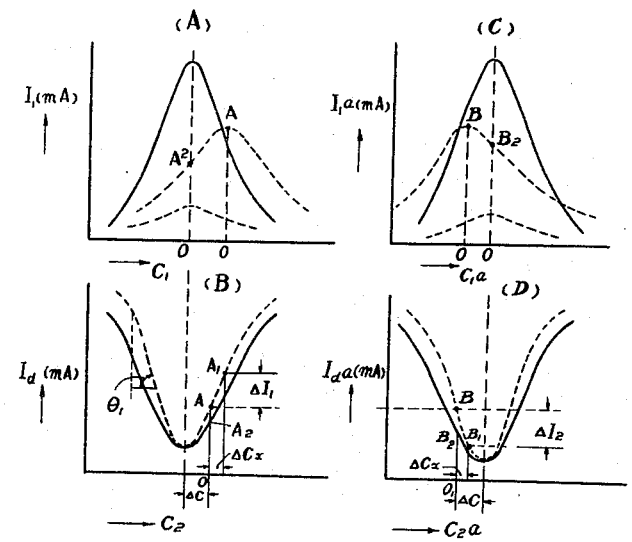
Fig-3-
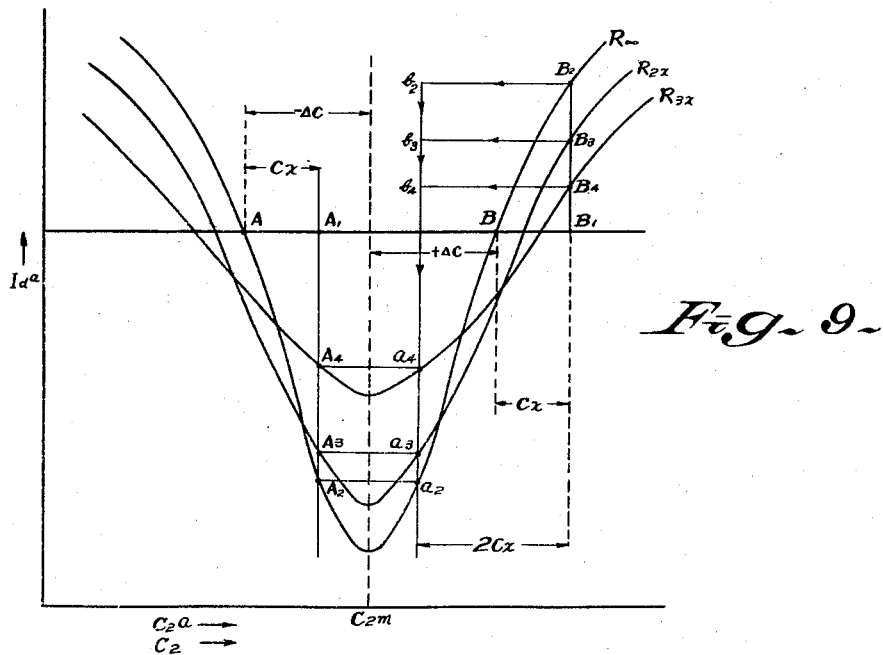
Fig-9-

United States Patent Office 2,906,950
Patented Sept. 29, 1959

2,906,950

MULTIPLE-TUNING TYPE, DIFFERENTIAL-ARRANGEMENT DEVICE FOR MEASURING REACTANCES

Bunjiro Ichijo, Hamamatsu-shi, Japan, assignor to Kokusai Denki Kabushiki Kaisha, Tokyo-to, Japan, a Japanese limited-liability company Application March 12, 1957, Serial No. 645,572

Claims priority, application Japan March 19, 1956

5 Claims. (Cl. 324—61)

This invention relates to a multiple-tuning type, differential-arrangement device for measuring reactances and particularly to a device capable of directly measuring a static capacity of a test specimen in a precise manner without being influenced by the resistance of the said specimen.

Heretofore, the present invention has already proposed a "Differential capacitance type device so constructed that it comprises detector circuit having two sets of identically-constructed and identically-arranged L-C circuits and a pick-up coil, and so that, by the adjustment of the capacity values of the said two L-C circuits so that they assume symmetrical positions particularly on both sides, respectively, of the tuning point on the tuning or resonance curve, by the connecting of the said detector circuits to an indicating meter so that their output currents flow, respectively, in opposite directions through the said indicating meter, and by the inserting of test specimen in two sets of electrodes connected in parallel to the said L-C circuits, the said device can be operated." However, since such a device is sensitive to variations in frequency of the high-frequency oscillator of the electrical source, the shifting of the zero point can not be avoided because of the infinitesimal frequency variations due to changes in the ambient temperature. An essential object of the present invention is to eliminate effectively the aforesaid disadvantage.

In order to attain the principal object, the device of the present invention is embodied in an infinitesimal-reactance-measuring device which may be said to be of a multiple-tuning type in which one tuning circuit is connected additionally, through a capacitance, to each of the aforesaid tuning circuits. The resulting device has an extremely high degree of measuring sensitivity and stability. By means of the device embodying the present invention, such conditions as moisture content and thicknesses of test specimens of such materials as textiles, papers can be read directly, independently of such conditions as the characteristics of the water or the temperature, through the variations in electrostatic capacities or in inductances, and, furthermore, the electrostatic capacities or the dielectric constants of semiconductors such as woods, textiles, and clays containing large quantities of water can be determined with precision.

The novel features of the invention can be better understood from the following detailed description, when taken together with the accompanying drawings, in which:

Fig. 1 is a schematic connection diagram explaining the principle of this invention.

Fig. 2 is a detailed connection diagram of one side only of Fig. 1.

Figs. 3(B) and 3(D) are two kinds of the characteristic curves indicating the relations between the indicator currents $I_d$, $I_d a$ and the capacitance of the variable capacitors $C_2$, $C_2 a$ in Fig. 1.

Figs. 3(A) and 3(C) are diagrams of two kinds of the characteristic curves indicating the relations between the currents $I_1$, $I_1 a$ of the tuning circuits and the variable capacitors $C_1$, $C_1 a$ in Fig. 1.

Figure 4:
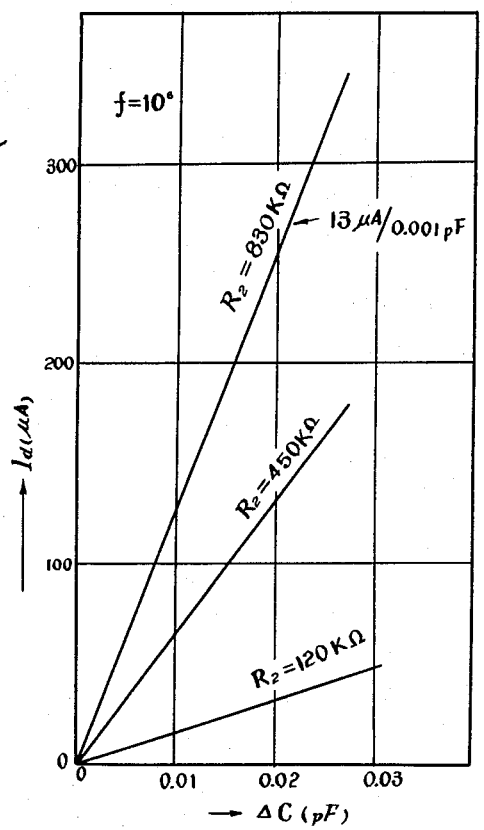

Fig. 4 is a diagram of characteristic curves indicating the relations between the variation $\Delta C$ of the variable capacitor $C_2$ and indicator current $I_d$, in Fig. 1.

Figure 5:
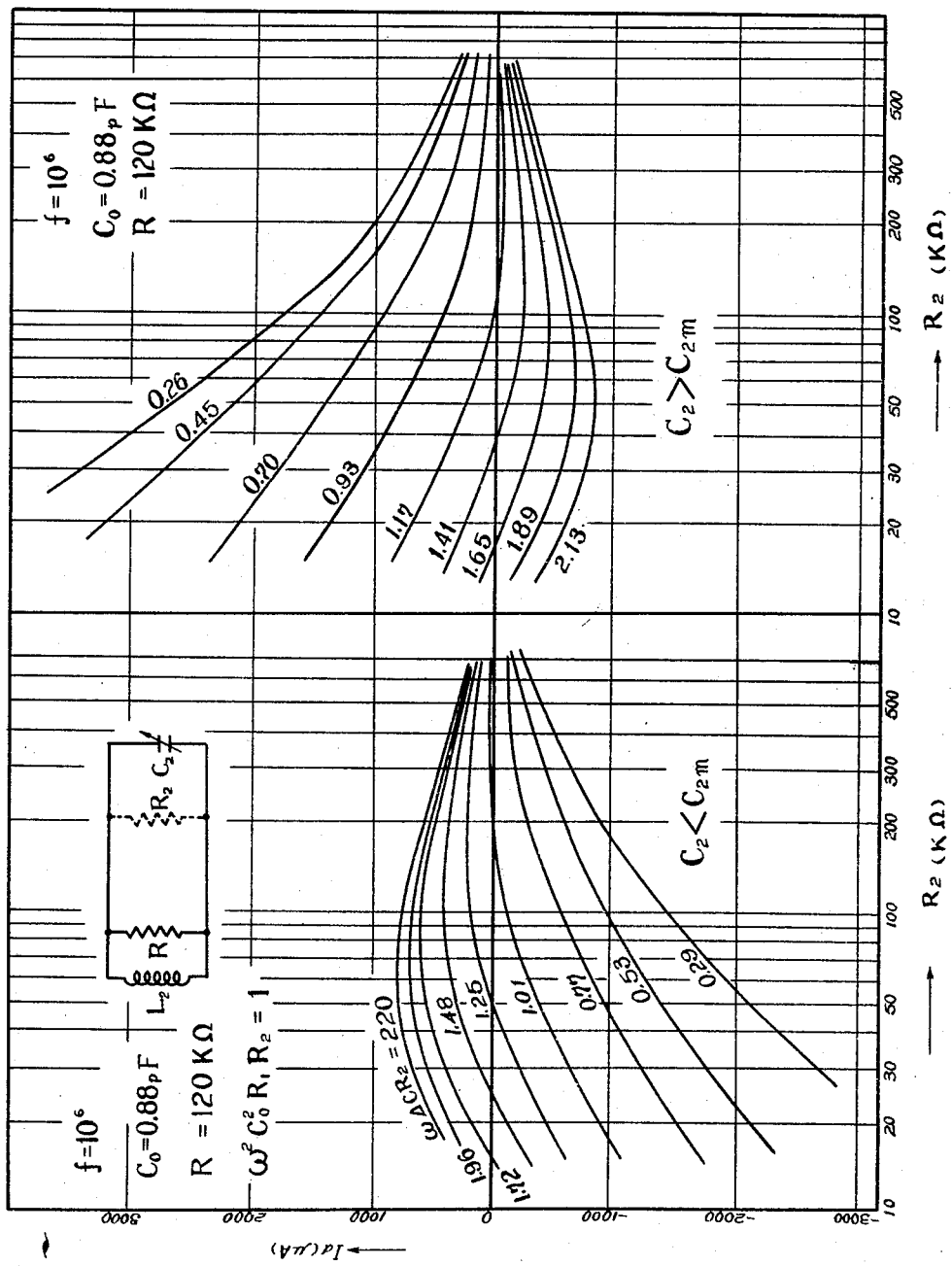

Fig. 5 is a diagram of characteristic curves indicating the relations between the indicator currents $I_d$ and the values of the resistance $R_2$ in Fig. 1.

Fig. 6 is a diagram of a characteristic curve indicating the relation between the indicator current $I_d$ and the water content $M_w$ of a test specimen.

Fig. 7 is a connection diagram of another example of this invention, for explaining the method of inserting the test specimen when the moisture content of such a material as fabric or paper is to be measured.

Figure 8:
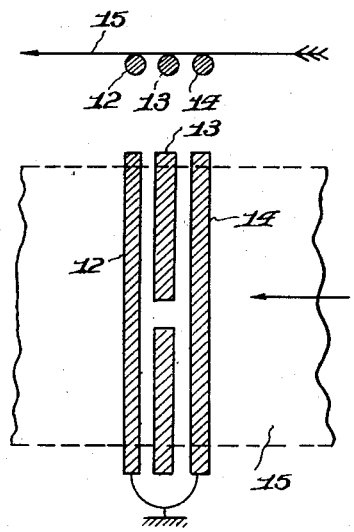

Fig. 8 is a plan and side view of a modification of an electrode, assemblage in this invention, for supporting a test specimen.

Fig. 9 is a diagram of characteristic curves indicating the relations between the indicator currents $I_d$, $I_d a$ and the capacitances of the variable capacitors $C_2$, $C_2 a$ in Fig. 1, in the case of adoption of an alternative method suitable for the measurement of the capacitance of a semi-conductor.

In Fig. 1, the device includes an oscillator 1 with stabilized frequency, two sets of first tuning circuits 2 and 2a which are coupled electro-magnetically or electro-statically to the tank circuit of the said oscillator 1 and pick-up coils 3 and 3a which are coupled to the said tuning circuits 2 and 2a, respectively. The high-frequency currents induced in the said pick-up coils are rectified by crystal or germanium rectifiers 4 and 4a, respectively, and flow through an indicator 5 in mutually opposite directions. Two sets of second tuning circuits 6 and 6a which are coupled electro-statically to the aforesaid first tuning circuits 2 and 2a, respectively, through capacitor $C_0$ and $C_0 a$ with infinitesimal capacitances, respectively. Test specimens 7 and 7a which are to be measured are connected in parallel with capacitors $C_{s1}$ and $C_{s1} a$, respectively, each of the said capacitors being one of the series capacitors $C_{s0}$, $C_{s1}$, and $C_{s0} a$, $C_{s1} a$, respectively.

In the carrying out of a measurement by the device as described above, the tuning circuits 2 and 2a are adjusted at a time in the following manner. First, the switch $S_1$ is closed, and the capacitor $C_1$ is adjusted so as to cause the current of the tuning circuit 2 to be at its maximum value. Next, the switch $S_1 a$ is closed, and the capacitor $C_1 a$ is similarly adjusted so as to cause the current of the tuning circuit 2a to be at its maximum value. Then the couplings between the oscillator 1 and the circuits are adjusted so that the two said maximum currents become equal. Next, if the switch $S_1$ is opened, and the capacity of the variable capacitor $C_2$ is varied, the relation between the capacitance of the capacitor $C_2$ and the indicator current $I_d$ will vary as indicated by the full line of Fig 3(B). However, if the capacitance of the capacitor $C_2$ is increased by $\Delta C$ from the minimum current position and set at the point O, the current $I_d$ will become $OA_2$. If, at this point, the capacitor $C_1$ of the first tuning circuit 2 is readjusted, and the multiple tuning circuit comprising the tuning circuits 2 and 6 is tuned, the said current will increase from $OA_2$ to $OA$. In this case, the current $I_1$ of the multiple tuning circuit will change from the full line of Figs. 3(A) and 3(B) to the dotted line.

Similarly, if the capacitance of the capacitor $C_2 a$ is reduced by $\Delta C$ from the minimum current position and set at point $O_1$, the current $I_d a$ will become $O_1 B_2$, and, through the readjustment of the condenser $C_1 a$, the current will become $O_1 B$ (see Fig. 3(D)). In this case, the current $I_1 a$ of the multiple tuning circuit will change from the full line of Figs. 3(C) and 3(D) to the dotted line. However, because these currents $I_d$ and $I_d a$ flow in mutually opposite directions through the indicator 5 and mutually suppress each other, even if their values are of the order of milliamperes, micro-ammeters of high sensitivity can be used as the indicating meter, and the sensitivity of the entire device will become extremely good. Then, if the specimens 7 or 7a to be measured is connected in parallel to $C_{s1}$ or $C_{s1}a$, the capacitance increase of the circuit 6 or 6a will become $$\Delta C_x \simeq \frac{C_x}{(1+C_{s1}/C_{s0})^2}$$

where $C_x \ll C_{s1}$, and the point A will shift to $A_1$, and the point B to $B_1$ in Fig. 3. Consequently, the output current corresponding to this $\Delta C_x$ will become $\Delta I_1$ or $\Delta I_2$ of Fig. 3(B) and Fig. 3(D); as a result, the indicating meter can be made to swing through a large angle.

Fig. 2 is indicated only one side of the circuit of Fig. 1, in which the same members are indicated by the same numerals. If, in this case, the detecting characteristic of the rectifier 4 is taken to conform to the square law characteristic, the current $I_d$ will be given by the following equation.

$$I_d = KE^2 = K\omega^2 M^2 e^2 \omega^4 C_1^4 R_1^2 \times \frac{(1+\omega^2 \Delta C^2 R_2^2)^2}{(1+\omega^2 \Delta C^2 R_2^2 + \omega^2 C_0^2 R_1 R_2)^2} \quad (1)$$

where, $K$ = a proportional constant
$E$ = induced voltage in the pick-up coil 3
$e$ = induced voltage from the oscillator in the first tuning coil $2_1$
$\omega = 2\pi f$, in which $f$ is the frequency
$M$ = mutual inductance between the circuit 2 and the coil 3
$R_1$ = resistance of the first tuning circuit 2
$R_2$ = resistance of the second tuning circuit 6
$C_1$ = capacitance of the first tuning circuit 2
$C_0$ = capacitance of the coupling $C_0$ Consequently, $$\frac{dI_d}{d\Delta C} = \tan \theta_1 = K\omega^2 M^2 e^2 \omega^4 C_1^4 R_1^2$$
$$\times \frac{4\omega^4 C_0^2 R_1 R_2^3 \Delta C (1+\omega^2 \Delta C^2 R_2^2)}{(1+\omega^2 \Delta C^2 R_2^2 + \omega^2 C_0^2 R_1 R_2)^3} \quad (2)$$

and when $$R_1 = \frac{1}{\omega^2 C_0^2 R_2} \times \frac{(1+\omega^2 \Delta C^2 R_2^2)(3\omega^2 \Delta C^2 R_2^2 - 1)}{3\omega^2 \Delta C^2 R_2^2 + 1} \quad (3)$$

$\tan \theta_1$ becomes a maximum.

By the substitution of Equation 3 into Equation 2, $$\tan \theta_1 (\max) = \frac{K\omega^2 M^2 e^2 \omega^4 C_1^4 R_1^2}{54}$$
$$\times \frac{\omega R_2 (9\omega^4 \Delta C^4 R_2^4 - 1)(3\omega^2 \Delta C^2 R_2^2 + 1)}{\omega^5 \Delta C^5 R_2^5 (1+\omega^2 \Delta C^2 R_2^2)} \quad (4)$$

Then, the value of $\omega \Delta C R_2$ for which Equation 4 becomes a maximum is $$\omega \Delta C R_2 = \pm 1$$

Also, $$\frac{\partial I_d}{\partial R_2} = 2K\omega^2 M^2 e^2 \omega^4 C_1^4 R_1^2$$
$$\times \frac{\omega^2 C_0 R_1 (\omega^2 \Delta C^2 R_2^2 + 1)(\omega^2 \Delta C^2 R_2^2 - 1)}{(1+\omega^2 C^2 R_2^2 + \omega^2 C_0^2 R_1 R_2)^3} \quad (5)$$

Therefore, when $\omega \Delta C R_2 = \pm 1$ in Equation 5, $$\frac{\partial I_d}{\partial R_2} = 0$$

As a result, it can be seen with the present circuit arrangement that the requisite condition for maximum variation, corresponding to the infinitesimal capacitance variation of 2nd resonant circuit, of the indicating ammeter and the requisite condition for the swing of the indicating pointer of the indicating ammeter to become zero for the infinitesimal variation of the resistance $R_2$ are coincident. This is the most significant special feature of the circuit arrangement embodying the present invention. The said feature cannot be obtained in the direct-reading capacitance meters existing hitherto.

In Figs. 4, 5 and 6 are shown drawings illustrating an example of an actual experiment showing the aforesaid relations. Fig. 4 indicates the relation of the variation of $\Delta C$ to the indicator current $I_d$. Fig. 5 indicates the fact that, under the condition for maximum indicating current, that is, for $\omega \Delta C R_2 = 1$, and within the range of 200 to 500 K$\Omega$ of the value of the resistance $R_2$, the indicated current $I_d$, without being influenced by variations in the resistance $R_2$, becomes almost constant. Fig. 6 illustrates an example of an actual experiment in the measurement of the water content $M_w$ of a test specimen and indicates the fact that the result of the said measurement is not influenced by the thickness $t$, that is, the resistance, of the said test specimen.

When the present device is to be used as only a direct-reading capacitance meter, either the specimen 7 or 7a of Fig. 1 becomes the specimen $C_x$ to be measured. However, when the present device is to be used as an instrument for measuring moisture content, either the specimen 7 or 7a in Fig. 1 may be made the specimen to be measured; or, as illustrated in Fig. 7, the electrodes 8 and 9 having a common grounded electrode 10 may be connected to the circuits 6 and 6a, and the test specimen 11 may be inserted between the said electrodes and moved. Rod-shaped electrodes 12, 13 and 14 in grill assemblage as illustrated in Fig. 8 may be used, and the test specimen 15 may be moved over, and in contact with, the electrodes.

In the measurement of the thickness of a specimen, the measurement can be made by the variation of the infinitesimal inductance of the coil of the circuit 6 or 6a. That is, if the specimen to be measured is placed between the surface of the said coil and a metal plate, the variation $\Delta L$ of the coil inductance L will be indicated as $\Delta L = LK^2$, wherein K is the coupling coefficient of the said coil and the said metal plate and varies with variation of the distance between the said coil and the said metal plate, that is, with the thickness of the said specimen. Therefore, the value of $\Delta L$, that is, the magnitude of the variation of current, will indicate directly the thickness. Consequently, in this case, for substances or materials other than metals, the thicknesses of the materials can be measured on the same calibration scale, regardless of their respective electrical properties.

Next, another method suitable for precise measurement, by means of a device embodying the present invention, of the electro-static capacities or the dielectric constants of semi-conductors, for example, woods, textiles, clays, etc., containing a large quantity of water, will be described in the following explanation.

In this method, with reference to Fig. 1, the capacitors $C_{s0}$ and $C_{s0}a$ are shorted, the capacitors $C_{s1}$ and $C_{s1}a$ are removed, and the test specimens $C_x$ having equivalent parallel resistance $R_x$, and which are inserted between two electrodes of identical construction, are directly connected in parallel, through the switches $S_2$ and $S_2a$, respectively, to the second tuning circuits 6 and 6a, respectively. Then, the switch $S_1$ is first closed; the capacitor $C_1$ is adjusted; the meter 5 is made to indicate maximum reading; and the degree of coupling with the electrical source is adjusted so that the current $I_d$ under these conditions is in the order of some milliamperes. Next, the switch $S_1$ is opened; the capacitor $C_2$ is adjusted; then the relation between the value capacitance of the capacitor $C_2$ and the current $I_d$ will become that as indicated by the V-shaped curves shown in Fig. 9. Each of these curves is geometrically quite symmetrical about the ordinate line for the capacitance of the capacitor $C_2$ corresponding to the minimum value of the current, $I_d$, that is, $C_{2m}$, regardless of whether the sign of the variation $\Delta C$ of the capacitance $C_2$ is positive or negative.

The adjustments with respect to capacitors $C_2a$ and $C_1a$ are carried out in a similar manner. When the values of the capacitances of the capacitors $C_2$ and $C_2a$ of these two tuning circuits are to be set at $C_{2m}+\Delta C$, and $C_{2m}-\Delta C$, respectively, the currents $I_d$ and $I_da$ of the upper and lower sets of circuits become the values indicated by the points A and B, respectively, on the curve $R_\infty$. Since these values are equal, the reading of the meter 5 will be zero. This completes the initial adjustment.

Next, if the switches $S_2$ and $S_2a$ are closed, and the test specimens $C_x$ are inserted simultaneously in both circuits, the point A, in accordance with the resistance value of the test specimen, will move in a manner such as that to $A_2$, $A_3$, or $A_4$, even for the same capacitance of the specimen $C_x$; and the point B will move as that to $B_2$, $B_3$, $B_4$. However, in Fig. 9, the movements $A \longrightarrow A_2$ and $B \longrightarrow B_2$ are those for the case when the specimen resistance is infinity, that is, $R_\infty$. Also $R_{2x} > R_{3x}$.

As one illustrative example, if it is assumed that the circuit resistance becomes $R_{2x}$ because of the test specimen, the output current becomes $A_3B_3$, that is, $a_3b_3$, because the point A moves to $A_3$ and the point B moves to $B_3$. Then, if the capacitance value of the capacitor $C_2$ is gradually decreased, the indication of the meter will gradually decrease until it finally becomes zero. That is, if the capacitance value of the capacitor $C_2$ is decreased along $B_3 \longrightarrow b_3$, point $a_3$ will be obtained as the point of intersection with the curve $R_{2x}$. However, points $A_3$ and $a_3$ represent currents of equal value and, at the same time, the curves are symmetrical with a centerline formed by the ordinate line through the capacitance $C_{2m}$. Therefore, in this case, the capacity variation represented by $B_3 \longrightarrow b_3$ corresponds exactly to $2C_x$. Consequently, the capacitance value of specimen $C_x$ can be read directly from the reading on the dial of the capacitor $C_2$.

By the use of this measuring method, as can be understood from Fig. 9, the capacitance of the specimen $C_x$ can be measured independently of the value of the resistance of the resistor $R_x$. Moreover, because the curves in their zero-current regions are sloped considerably, the precision of measurement is increased. At the same time, because of the differential type of arrangement, a microammeter of high sensitivity can be used as the indicator, and capacitances can be measured, thereby, with extremely high precision.

The foregoing examples of practical application are merely examples presented for explaining the principle of the present invention and for an understanding of its applications. It should be understood that the present invention is not limited to the aforementioned examples of practical applications, but is capable, within its stated scope, of being useful in several forms and variations thereof.

I claim as my invention:

1. A multiple-tuned differential system for measuring a physical characteristic or condition which is accurately proportional to a change of reactance or impedance produced by it in the system and reflected as a signal to indicate the change comprising, in combination; a stabilized high-frequency oscillator; a first pair of separate tuning circuits individually coupled to said oscillator; a second pair of tuning circuits each electrostatically, and serially coupled to a respective circuit of said first pair of tuning circuits; a pair of pick-up coils each electromagnetically coupled to a respective circuit of said first pair of tuning circuits; indicating circuits differentially connected to said coils to detect and indicate current flow induced in said coils; means connected to said differentially connected circuits for indicating the value of the current flow which is representative of the physical characteristic or condition to be measured, means including variable tuning capacitors connected in said tuning circuits for adjustably causing the indicating means to indicate zero current flow in preparation for a measurement; and circuit means including test electrodes electrostatically coupled to said second pair of tuning circuits for connecting at least one specimen in parallel with said second pair of tuning circuits thereby to measure a physical characteristic or condition thereof and indicate the value thereof on said indicating means.

2. A multiple-tuned differential system for measuring a physical characteristic or condition which is accurately proportional to a change of reactance or impedance produced by it in the system and reflected as a signal to indicate the change comprising, in combination; a stabilized, high-frequency oscillator; a first pair of separate tuning circuits individually electromagnetically coupled to said oscillator; a second pair of tuning circuits each electrostatically, and serially coupled to a respective circuit of said first pair of tuning circuits; a pair of pick-up coils each electromagnetically coupled to a respective circuit of said first pair of tuning circuits; indicating circuits differentially connected to said coils to detect and indicate current flow induced in said coils; means connected to said differently connected circuits for indicating the value of the current flow which is representative of the physical characteristic or condition to be measured, means including variable tuning capacitors connected in said tuning circuits for adjustably causing the indicating means to indicate zero current flow in preparation for a measurement; and circuit means including test electrodes electrostatically coupled to said second pair of tuning circuits for connecting at least one specimen in parallel with said second pair of tuning circuits thereby to measure a physical characteristic or condition thereof and indicate the value thereof on said indicating means.

3. A multiple-tuned differential system for measuring a physical characteristic or condition which is accurately proportional to a change of reactance or impedance produced by it in the system and reflected as a signal to indicate the change comprising, in combination; a stabilized, high-frequency oscillator; a first pair of separate tuning circuits individually electrostatically coupled to said oscillator; a second pair of tuning circuits each electrostatically, and serially coupled to a respective circuit of said first pair of tuning circuits; a pair of pick-up coils each electromagnetically coupled to a respective circuit of said first pair of tuning circuits; indicating circuits differentially connected to said coils to detect and indicate current flow induced in said coils; means connected to said differentially connected circuits for indicating the value of the current flow which is representative of the physical characteristic or condition to be measured, means including variable tuning capacitors connected in said tuning circuits for adjustably causing the indicating means to indicate zero current flow in preparation for a measurement; and circuit means including test electrodes electrostatically coupled to said second pair of tuning circuits for connecting at least one specimen in parallel with said second pair of tuning circuits thereby to measure a physical characteristic or condition thereof and indicate the value thereof on said indicating means.

4. A multiple-tuned differential system for measuring a physical characteristic or condition which is accurately proportional to a change of reactance or impedance produced by it in the system and reflected as a signal to indicate the change comprising, in combination; a stabilized, high-frequency oscillator; a first pair of separate tuning circuits individually coupled to said oscillator; a second pair of tunning circuits each electrostatically and serially coupled to a respective circuit of said first pair of tuning circuits; capacitors individually coupling each of said second pair of tuning circuits to said first pair of tuning circuits; each of said capacitors being of an infinitely small capacitance; a pair of pick-up coils each electromagnetically coupled to a respective circuit of said first pair of tuning circuits; indicating circuits differentially connected to said coils to detect and indicate current flow induced in said coils; means connected to said differentially connected circuits for indicating the value of the current flow which is representative of the physical characteristic or condition to be measured, means including variable tuning capacitors connected in said tuning circuits for adjustably causing the indicating means to indicate zero current flow in preparation for a measurement; and circuit means including test electrodes electrostatically coupled to said second pair of tuning circuits for connecting at lease one specimen in parallel with said second pair of tuning circuits thereby to measure a physical characteristic or condition thereof and indicate the value thereof on said indicating means.

5. A multiple-tuned differential system for measuring a physica lcharacteristic or condition which is accurately proportional to a change of reactance or impedance produced by it in the system and reflected as a signal to indicate the change compirsing, in combination; a stabilized, high-frequency oscillator; a first pair of separate parallel tuned circuits individually coupled to said oscillator; a second pair of parallel tuned circuits each electrostatically and serially coupled to a respective circuit of said first pair of tuning circuits; a pair of pick-up coils each electromagnetically coupled to a respective circuit of said first pair of tuning circuits; indicating circuits differentially connected to said coils to detect and indicate current flow induced in said coils; means connected to said differentially connected circuits for indicating the value of the current flow which is representative of the physical characteristic or condition to be measured, means including variable tuning capacitors connected in said tuned circuits for selectively, adjustably causing the indicating means to indicate zero current flow in preparation for a measurement; and circuit means including test electrodes electrostatically coupled to said second pair of tuning circuits for connecting at least one specimen in parallel with said second pair of tuning circuits thereby to measure a physical characteristic or condition thereof and indicate the value thereof on said indicating means.

References Cited in the file of this patent

UNITED STATES PATENTS

| | | |
|---|---|---|
| 2,146,073 | Jennens et al. | Feb. 7, 1939 |
| 2,178,471 | De Bruin | Oct. 31, 1939 |
| 2,273,066 | Povey et al. | Feb. 17, 1942 |
| 2,337,759 | Loughlin | Dec. 28, 1943 |
| 2,457,727 | Rifenbergh | Dec. 28, 1948 |
| 2,487,523 | Coake | Nov. 8, 1949 |